Sept. 30, 1969     SHOICHI ISHIKAWA     3,469,463
FRICTIONAL DRIVE SPEED CHANGER
Filed Nov. 6, 1967     2 Sheets-Sheet 1
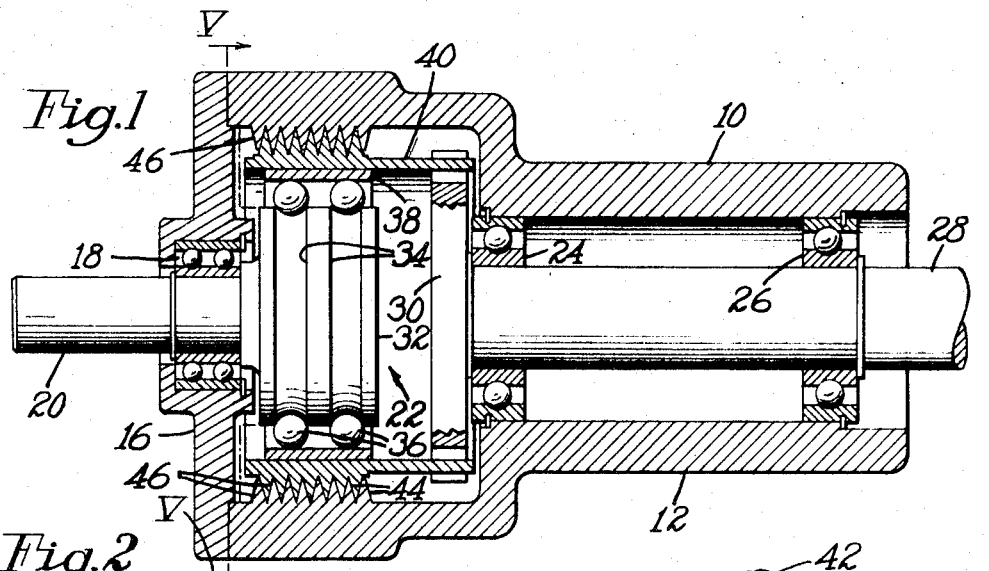
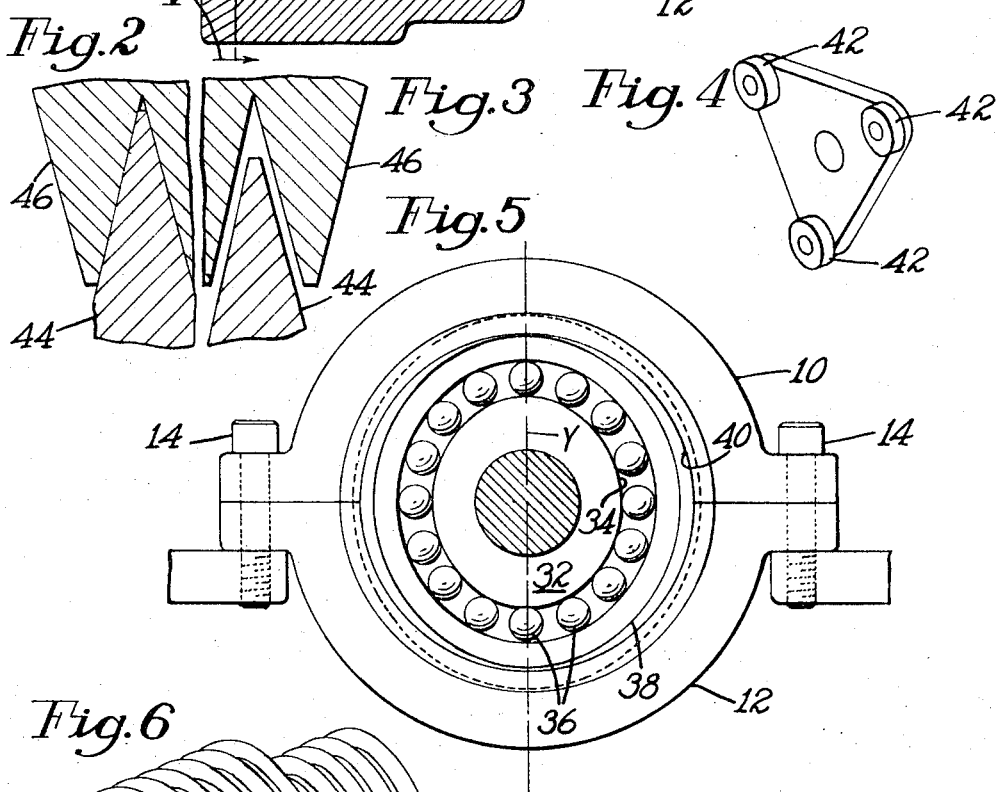
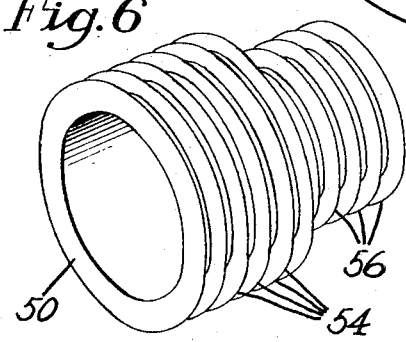
Inventor
Shoichi Ishikawa
By his Attorney
Carl E. Johnson Sept. 30, 1969  SHOICHI ISHIKAWA  3,469,463
FRICTIONAL DRIVE SPEED CHANGER
Filed Nov. 6, 1967  2 Sheets-Sheet 2

United States Patent Office 3,469,463
Patented Sept. 30, 1969

3,469,463
FRICTIONAL DRIVE SPEED CHANGER
Shoichi Ishikawa, Yokohama-shi, Japan, assignor to
United Shoe Machinery Corporation, Boston,
Mass., a corporation of New Jersey
Filed Nov. 6, 1967, Ser. No. 680,884
Int. Cl. F16h 13/06, 33/02
U.S. Cl. 74—206                                      5 Claims

ABSTRACT OF THE DISCLOSURE

A rotary actuator employs a wave of radial deflection to mesh circumferentially extending grooved surfaces respectively formed in coaxial tubular members, one of which is a reaction element and is deflectable to a different degree than the other, at spaced circumferential localities of engagement, and thereby frictionally convert an input speed to a changed output speed. In contrast to known toothed harmonic drive mechanisms, a minimum of only one groove per tubular member is required, successive grooves may be unequally spaced, for both members the pitch is zero, i.e., their grooves extend normal to the axis of rotation, and the drive may be impositive.

Background of the invention

This invention pertains to a mechanical movement of the class wherein at least one of two relatively rotatable bodies is provided with interengaging elements whereby a body will impart to or receive motion from some other member by rolling contact. More especially the invention resembles transmissions of the general type using controlled elastic deflection. When these employ tooth or thread type gearing they are usually known as harmonic drive actuators, several embodiments being disclosed for instance in United States Letters Patent No. 2,906,143, issued upon an application filed in the name of C. Walton Musser. In the prior art an earlier reduction drive devoid of gearing but relying on frictional engagement with a deformable annular member for low torque output is disclosed, for example, in United States Letters Patent No. 2,030,700 issued in the name of M. C. Hoxie.

Summary of the invention

A primary object of the present invention is to provide by simple construction an improved speed changer of the friction type which shall employ radial deflection of at least one of two interengaging coaxial members and, while not affording high torque capability to the extent afforded by harmonic drive gearing, shall attain at relatively low cost many of the advantageous features of both the positive drive exemplified by the Musser construction and the impositive traction taught by devices such as that of Hoxie.

Another object of the invention resides in providing a high ratio reducer or speed increaser assemblage of negligible back lash which can be compact, transmit moderate torque, and be readily manufactured or few parts respectively having norminal tolerance. A further object of the invention is to provide a low cost reducer of the type indicated wherein the operating components may be of a wide variety of materials or of combinations of materials, for instance steel and/or injection molded plastics.

To these ends the invention comprises in coaxial relation three basic members, namely: (1) an annular member formed either internally or externally with at least one circumferential groove extending normal to its axis, (2) a flexible tubular member formed with a circumferential land arranged to interengage with the walls of said groove in the annular member, and (3) a wave generator means for radially deflecting the circumferential land into engagement with the groove walls at circumferentially spaced localities and for progressing these localities. Advantageously, the wave generator means may, as hitherto used in harmonic drive actuators, be mechanical, hydraulic, or electrical, to provide the frictional engagement at two or more circumferential localities. Also, in the manner disclosed in the case of harmonic drive actuators, any one of the three basic members may serve as an input, another may function as a ground or anchor to provide reaction, and the third may be an output. Other resemblances will hereinafter be mentioned or become apparent, but it is of particular interest that the mating lands and grooved surfaces of the present invention have no lead, extend only in general planes normal to the axis of rotation, and may be easily formed in a range of tolerance, utilizing for instance, the common cross section of spline teeth having pressure angles of about 20° and usually less than 45°. Thus working areas provided by the tangentially coacting walls of the grooves are enlarged over prior friction drive devices, and relatively higher torque capacity is also derived from the wedging or jamming engagement provided between the mating grooved surfaces.

Brief description of the drawings

The foregoing and other features of the invention, together with novel details in design and arrangements of parts, will now be more particularly described in connection with several illustrative embodiments and with reference to the accompanying drawings thereof, in which:

FIG. 1 is an axial section of a single stage frictional speed changer exemplifying the invention;

FIG. 2 is an enlarged profile view of frictionally engaging rib and groove walls as seen in FIG. 1;

FIG. 3 is a view similar to FIG. 2 but showing the rib and groove walls disengaged at a circumferential locality 90° out of phase with the showing in FIG. 2;

FIG. 4 is a perspective of one alternative form of wave generator, in this case 3-lobed, which may be used in lieu of a 2-lobe ball type wave generator shown in FIG. 1;

FIG. 5 in a transverse section taken on the line V—V of FIG. 1 and indicating the 2-part housing fixedly mounted;

FIG. 6 is a perspective of a flexing sleeve for a high ratio dual reducer;

Referring to FIGS. 1 and 5 the illustrative single stage speed changer comprises a fixed housing having an upper half 10 and a lower half 12 preferably provided with bored flanges for receiving anchoring bolts 14 (FIG. 5). An end cap 16 (FIG. 1) of the housing is fitted with a bearing 18 for rotatably receiving a shaft 20 (here assumed to be providing input )one end of which is secured to a wave generator generally designated 22. Spaced bearings 24, 26 in the housing support a shaft 28 which is assumed to be an output member through it will be understood that the assembly is reversible in which case the shaft 28 can serve as an input and the shaft 20 an output. For driving the shaft 28 frictionally at a speed reduced from that of the shaft 20, a castellated flange 30 (FIG. 1) of the shaft 28 is coupled to transmission mechanism about to be described.

Figure 7:
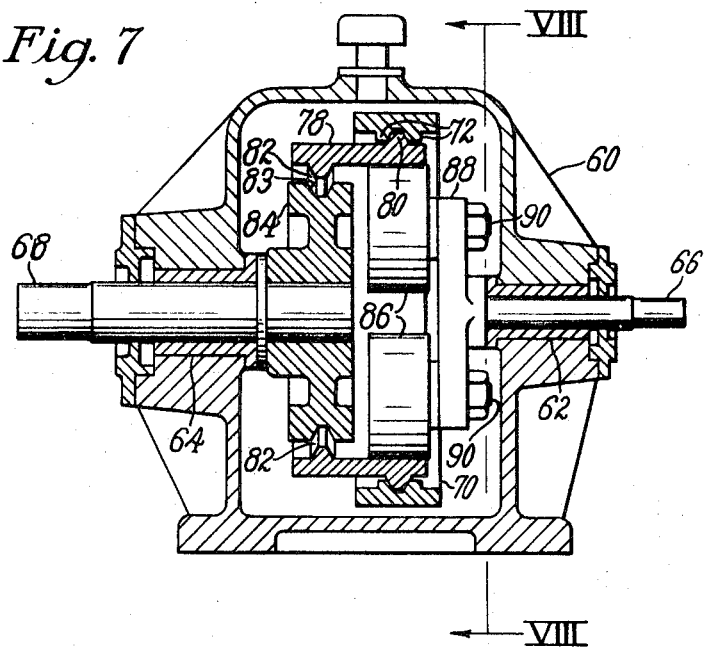
FIG. 7 is an axial section of a further modified or low ratio dual form of my frictional speed changer.

The wave generator 22 comprises, essentially in the manner of conventional harmonic drive actuators an elliptoidal hub 32 formed with races 34 for retaining bearing balls 36 in an elliptoidal outer bearing ring 38. This ring has its major axis Y shown vertical in FIG. 5 thus radially deflecting, at diametrically opposite localities, a resilient externally grooved operating ring 40 into frictional engagement at corresponding localities with an internal, circumferentially grooved surface of the housing 10, 12. It will be understood that differently constructed wave generators may be employed such as the 3-lobe type shown in FIG. 4 where rollers 42, for instance, are employed or the wave generator may be of a hydraulic or electromagnetic type as hitherto disclosed in conjunction with harmonic drive mechanism. In lieu of being castellated, the ring 40 may be cup-shaped.

Unlike conventional harmonic drive construction, however, the grooves formed on the operating ring 40 provide circumferential lands or ribs 44 (FIGS. 1–3) extending normal to the axis of rotation and have no thread advance or axial pitch. Likewise mating ribs 46 on the housing are of zero pitch. Accordingly, as indicated in FIGS. 1 and 2, major axis localities of mating walls of the circumferential ribs 44, 46 are in frictional engagement, and minor axis localities of these walls are disengaged as illustrated at FIG. 3. Employing the housing 10, 12 in 2-part construction facilitates initial assembly of the grooved members. While a plurality of interengaging ribs is shown in FIG. 1, it will be appreciated that a reduced number as low as a single interengaging rib on each of the mating members may suffice. It is further to be understood that, as in known harmonic drive gearing, while only internally disposed wave generators are herein shown for the sake of simplicity, the wave generator 22 may alternatively be disposed externally of the operating ring 40 to deflect it radially inward into meshing relation with the usually less flexible, cooperating grooved member; in this so-called "inside out" arrangement of the invention (not shown) the frictional interengagement of the walls of the ribs occurs at their minor axis localities, the major axis localities then being disengaged.

Not only is there an enlarged area of frictional interengagement afforded by the mating V-shaped walls of the ribs 44, 46 thereby insuring added torque capacity over an arrangement merely using cylindrical surfaces of engagement, but the deflecting operation of the wave generator 22 provides a wedging or jamming engagement between the mating grooved surfaces beneficial to production of torque with reduced slippage. The acute angles of the respective grooves need not all be equal, nor even of corresponding shape, but it is generally preferred that the apex angle of the ribs and their mating grooves be in the range of about 20° to 45°.

Conducive to low cost manufacture, the operating ring 40 or the housing 10, 12, or both, may be of plastic or metal. The grooves defining the ribs 44, 46 may be generated by a lathe or other means. While the ring 40 will normally be of material more easily deflected radially more than the housing 10, 12, it will be understood that it is within the scope of this invention to have their yieldability differ otherwise, or to utilize wave generators which are designed to provide some degree of radial yield or take-up when so desired.

Briefly to review operation of the transmission of FIGS. 1–5 inclusive, rotation of the wave generator 22 results in corresponding rotation of the major axis of the operating ring 40. Its ribs 44 at the diametrically opposed localities along and adjacent to that axis are accordingly deffected outwardly into tangential frictional engagement with the non-rotating walls of the matching ribs 46, the latter being either rigid or deflectible radially to a lesser extent than the ribs 44. Assuming that the rib interengagements are rolling with no slippage, the ratio becomes a function of two different circumferences; thus, if the pitch circle of the output operating ring 40 has a diameter designated $D_1$ and the pitch circle of the stationary or anchoring housing 10, 12 is $D_2$, the reduction ratio is $$\frac{D_1}{D_1-D_{-2}}$$

Output rotation of the ring 40 and hence of the shaft 28 is in a direction opposite to that of the input shaft 20.

The invention is also useful in two different forms of 2-stage arrangement for transmitting greater torque. One of these dual forms, a comparatively lower ratio type, will be explained with reference to FIGS. 7–9, the nature of a higher ratio dual now being indicated in connection with FIG. 6. FIG. 6 illustrates a coaxial, radially deflectible operating ring 50 which, in contrast to a corresponding ring 78 shown in FIGS. 7–9, has two axially spaced external sets of circumferential ribs 54, 56 each of different circumference. A wave generator (not shown) may operate internally of the set of ribs 54 to cause them to coact in the manner above explained with a stationary set of matching internal ribs (not shown). The ribs 56 are thereby frictionally driven in the same direction as the ribs 54. A coaxial circular, relatively less deflectible output rotor (not illustrated) having internal circumference ribs mating frictionally with the ribs 56 is thus driven with high torque. It will be understood that the stationary internal mating ribs of the external member can be arranged frictionally to engage with either of the sets of external ribs 54 or 56 to enable the other to transmit the output.

Figure 8:
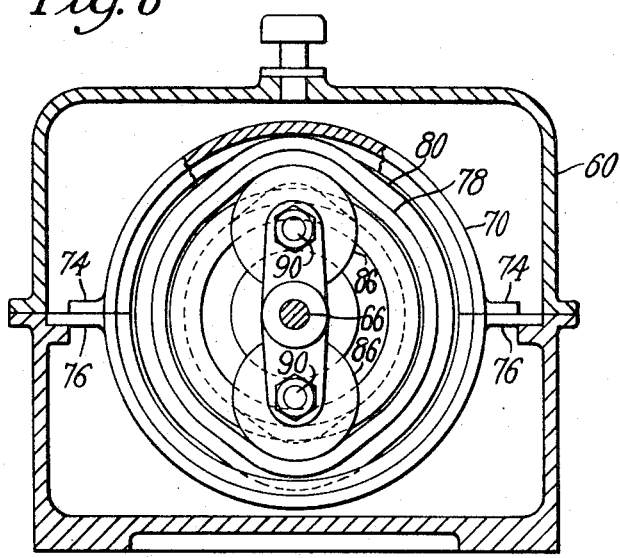
FIG. 8 is a transverse section of the assembly shown in FIG. 7, taken on the line VII—VII therein, and indicating the localities of circumferential engagement and disengagement.
Figure 9:
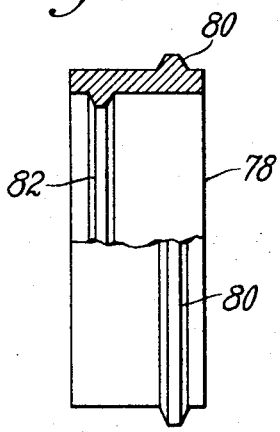
FIG. 9 is a view of an operating ring shown in FIGS. 7 and 8, and in half section to indicate its internal and external offset ribs.

Referring now to FIGS. 7 and 8, a 2-part stationary housing 60 has its opposite ends respectively bored to receive coaxial sleeve bearings 62 and 64 for rotatably supporting an input shaft 66 and an output shaft 68. An annular member 70 having at least one internal V-shaped groove to provide at least a pair of circumferential ribs 72 (FIG. 7) is fixed against rotation in the housing 60, for instance by means of radial abutments 74, 76 (FIG. 8). In this arrangement an operating ring 78 (FIG. 9) has at least one external circumferential rib 80 for frictionally mating with the walls of the ribs 72, and at least one internal circumferential rib 82 frictionally engageable with the mating walls of a circular groove 83 formed in a pulleylike coaxial output wheel 84 secured on the inboard end of the shaft 68. As in the construction previously described, the ring 78 may be of radially deflectible material, an elastomer, leather or other material.

In this lower ratio dual construction of FIGS. 7, 8, an elliptoidal wave generator is shown comprising diametrically opposite rollers 86, 86. An arm 88 secured at its mid point to the inner end of the input shaft 66 receives in its respective ends a bearing stud 90 for rotatably supporting the rollers 86 in deflecting relation against the inner circumference of the ring 78. As a consequence the rib 80, having the circumferential length of its pitch circle less than that of the rib 72, is at diametrically opposite localities deflected outwardly as shown in FIG. 8 into frictional engagement. Portions angularly intermediate the engaging portions of the rib 80 are disengaged from the rib 72, as also shown in FIG. 8. Because the operating ring 78 is being radially stretched by the rollers 86 at the major axis, the wheel 84 has the walls of its groove 83 in frictional engagement with the internal rib 82 only at localities about 90° out of phase with the rollers 86.

In operation the rollers 86 rotate about their own axes while having planetary motion about the axis of the shaft 66. Resultant circumferential wave motion generated in the ring 78 progresses the localities of meshing of the rib 80 with the non-roating ribs 72. Consequent frictional driving of the ring 78 results in its internal rib 82 having frictional engagement with the wheel 84 at outer phase localities whereby the wheel is also rotated and at a net reduced ratio. Where $L_1$ = circumferential length of pitch circle of the ribs 72,
$L_2$ = circumferential length of pitch circle of the rib 80,
$L_3$ = circumferential length of pitch circle of the rib 82, and
$L_4$ = circumferential length of pitch circle of the rib 83, the ratio, assuming no slippage may be expressed:

$$-\frac{L_1 \times L_3}{L_2 \times L_4} + 1$$

In addition to providing smooth transmission with minimum noise and vibration, the speed changers above described are of inexpensive construction, compact, can have their ratios altered by the substitution of only two working parts, and avoid damage due to overload.

Having thus described my invention, what I claim as new and desire to secure by Letters Patent of the United States is:

1. A rotary transmission comprising, in coaxial relation, a tubular member, a radially deflectible operating ring, one of each of said tubular member and operating ring having at least one circular groove extending without lead in a plane normal to its axis, the other having a circular rib formed without lead to engage with the wall of said groove, and a rotary wave generator for radially deflecting the ring at circumferentially spaced localities to cause progressive frictional engagement between said rib and the groove wall of the tubular member, one of the operating ring and the member being mounted to provide reaction for frictionally driving the other with a speed differing from that of the wave generator.

2. A transmission as set forth in claim 1 wherein the walls of the ribs of the operating ring and of the groove of the tubular member have an apex angle of less than 45° whereby wedging action for increased traction is obtained.

3. A transmission as set forth in claim 1 wherein the operating ring has its ribs externally formed and arranged for meshing with the walls of internal V-shaped grooves in said tubular member, the latter being held stationary whereby the ring is frictionally driven.

4. A transmission of the type set forth in claim 1 wherein said operating ring has two coaxial portions respectively having circumferential ribs, the ribs on one portion having greater circumferential length, and one of said portions being grounded to said tubular member to provide a frictional drive of an output member through engagement of the ribs of the other of said portions therewith.

5. A friction transmission comprising a housing, an input shaft and an output shaft coaxially journaled therein, an annular member having at least one internal circular groove and fixedly mounted in the housing, a radially deflectible operating ring having at least one external V-shaped rib arranged to engage the walls of the grooves, respectively, of said member, and having at least one internal V-shaped rib axially spaced from said external ribs, a wave generator operatively carried by one of said shafts and arranged to radially deflect the external ribs of said operating ring into spaced circumferential engagements with said internal grooves, respectively of the member, and an externally grooved wheel secured on the other of said shafts for frictional driving relation to said internal V-shaped rib of the ring.

References Cited

UNITED STATES PATENTS

| 2,906,143 | 9/1959 | Musser | 74—640 |
| 3,159,039 | 12/1964 | Stiff | 74—640 XR |
| 3,161,081 | 12/1964 | Musser | 74—640 |

FRED C. MATTERN, Jr., Primary Examiner

J. A. WONG, Assistant Examiner

U.S. Cl. X.R.

74—640